May 28, 1963  G. H. N. BESSETTE  3,091,129
CHAIN AND SPROCKET DRIVE STRUCTURE
Filed March 3, 1961  2 Sheets-Sheet 2
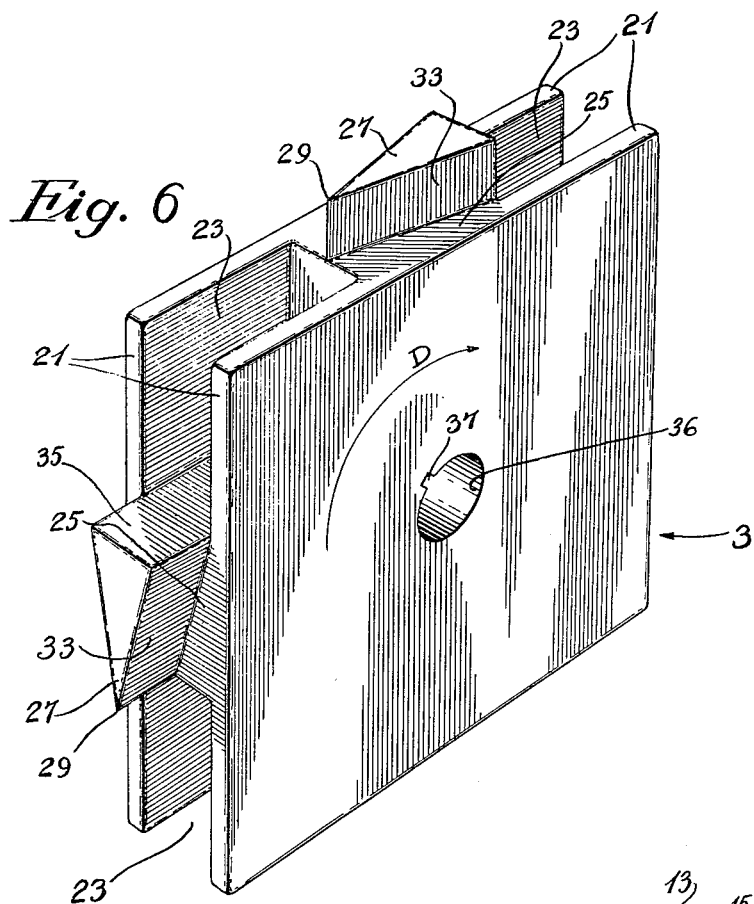
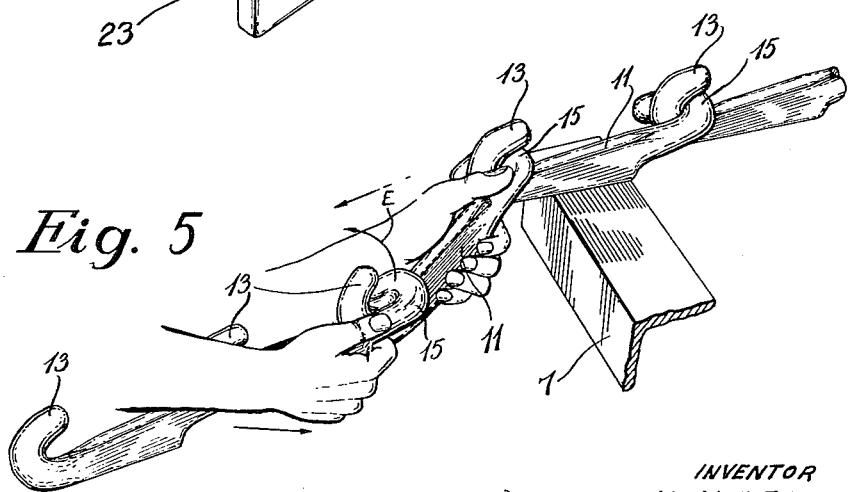
INVENTOR
Georges H. N. BESSETTE
ATTORNEYS United States Patent Office 3,091,129
Patented May 28, 1963

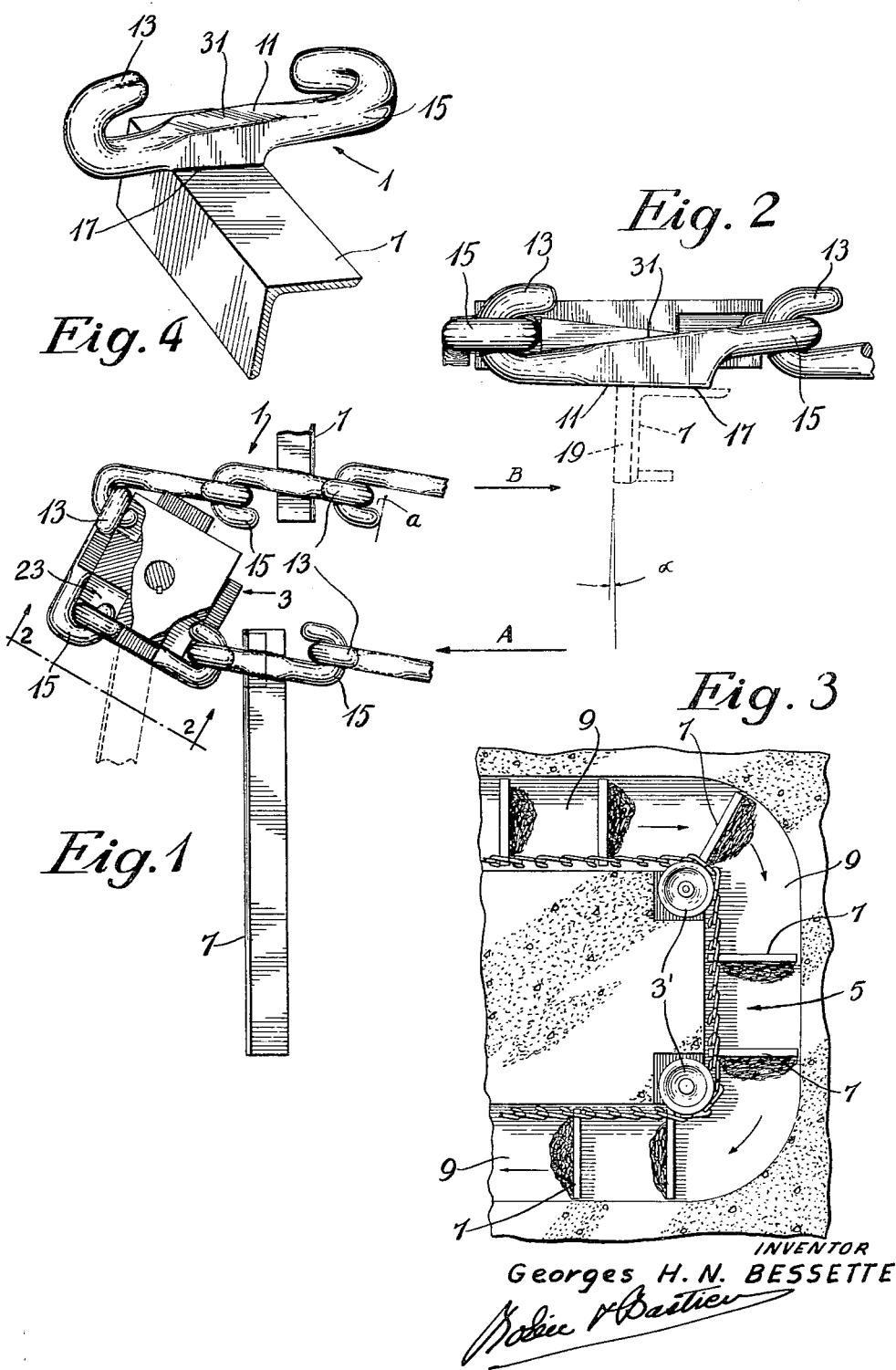

3,091,129
CHAIN AND SPROCKET DRIVE STRUCTURE
Georges Henri N. Bessette, Rte. 2, Iberville,
Quebec, Canada
Filed Mar. 3, 1961, Ser. No. 93,132
3 Claims. (Cl. 74—229)

This invention pertains generally to improvements in a chain and sprocket drive structure and more particularly relates to improvements in the construction and operation of links cooperating with similar links to form a chain used as conveyor for various tasks.

The main character and principal object of the invention lies in the provision of an improved chain formed of a plurality of identical interchangeable sturdy links and which chain has the advantages of ordinary chains in that it may be rocked and bent at will but differs therefrom in that it can readily be separated in its component links without any effort.

Another important object of the invention is to provide a chain link which, in association with similar links, form an elongated chain which, even though the links are readily separable, will not easily come apart under normal conditions of use.

A further object of the invention lies in the provision of a chain which can easily be tightened by the simple removal of a link. This removal of a link is greatly simplified because no special tool is required to effect it; the links moving apart by manual handling alone.

It is still another object of the invention to provide a chain composed of a plurality of links of the abovementioned type arranged in succession, and wherein some of the links are provided with laterally extending scrapers which have their scraping surface slightly forwardly inclined in the direction of travel of the chain.

It is also an object of the invention to provide a sprocket wheel or driving pulley especially adapted to transmit motion to a chain having links of the abovementioned type.

These objects are attained by the provision of a conveyor chain wherein each link comprises a body having two ends turned inwardly towards one another to form hooks but having the hooks extending substantially normal to one another.

A better understanding of the invention will be had by the following description of a preferred embodiment and having reference to the accompanying drawings, wherein:

FIG. 1 shows, in plan view, a conveyor chain embodying the link of the invention; the chain being trained around the novel driving sprocket wheel; the latter being shown partly cut away.

FIG. 2 is a view of the conveyor chain, taken along line 2—2 of FIG. 1.

FIG. 3, shows a plan view of a conveyor chain according to the invention, as used for cleaning barns and the like.

FIG. 4 shows an individual link provided with a cleaning scraper.

FIG. 5, is a perspective view depicting how the links can be separated from the chain, and FIG. 6 is a perspective elevation view of a sprocket wheel to be used in conjunction with the chain.

As shown in FIG. 1, the invention consists of a conveyor chain formed of a plurality of chain elements or links 1 and of a sprocket wheel 3 around which the chain is trained and which provides the driving power. As best appreciated in FIG. 2, the wheel 3 can be rotated in one direction only, as the end of a horizontal link 15 has to abut a projection 27 (FIG. 6) to produce displacement of the chain.

In barn cleaning, as is known and as is shown in FIG. 3, a collecting trench 9, substantially rectangular in cross-section, is formed around the concrete floor of the barn. Along the inner edge of the trench 9, a conveyor chain 5 travels which is formed of a plurality of successively connected links, some of which are provided with scrapers 7 dragged along the bottom of the trench 9 to collect manure. In winding bends, the chain 5 is guided by pulleys 3' which need be of the ordinary type only since their sole function is to guide the chain.

As best seen in FIGS. 1, 2 and 4, each link comprises an elongated body 11 which has two ends 13 and 15, each turned inwardly towards one another to form hooks. It will be noted that the hooks are so formed that they extend in directions normal to one another.

Hook 13 is turned upwardly and describes an arc of circle, approximately equal to 180°, so that the adjoining hook 15 may easily be removed from hook 13, and vice-versa, as shown in FIG. 6. Therefore, the diameter of each arc forming hooks 13 and 15 is at least as great as the involved thickness of the hooks. In the preferred case, the thickness concerned is the diameter, as the ends of body 11 are circular in cross-section, as shown.

As clearly shown in FIGS. 1 and 3, the main portion of body 11 is inclined in relation to the line of pull indicated by arrows A and B. In fact this line of pull coincides with the line joining the centers of the arc forming hooks 13 and 15, as will be readily understood by inspection of FIG. 2.

In order to avoid pivoting of scrapers 7 and subsequent twisting of the chain 5 where there is a resisting obstacle in the trench 9, scrapers 7 are given a slight forward inclination, as shown in FIG. 2. This is obtained by providing a lower flat surface 17 in the central portion of link body 11, which flat surface 17 is normal to the general plane of hook 13 and inclined in relation to the line joining the center of the arcs forming hooks 13 and 15. The angle of inclination is clearly shown in FIG. 2 and may be in the order of 5°.

Because of the inclination of main body 11 in relation to the line of pull as mentioned above, it will be realized, of course, that scrapers 7 are fixed to lower surface 17 at an angle so that they may be normal to the line of pull and to the lateral walls of trench 9.

Scrapers 7 are preferably angular members and may be provided with a stiffening frontal plate 19. The links themselves may be formed of durable metal such as steel and be either forged or cast.

The sprocket wheel, generally identified by numeral 3, is clearly depicted in FIG. 6. It is formed of a quadrilateral, generally square body provided with lateral edge surfaces 21 through which are formed recesses 23, here shown as substantially rectangular, which are adapted to receive the hook ends of the links. In forming these recesses 23, flat lands 25 are obtained therebetween. Integral with these lands and projecting therefrom, are projections 27, one face of which is inclined towards one of the lateral faces of wheel 3. For convenience of manufacture and use, triangular projections are made which have their apex pointing in a common direction around the wheel and in a direction opposed to the rotation as shown by arrow D.

In trained position, as shown in FIGS. 1 and 2 a horizontal hook 15 enters a recess 23 and its forward end abuts a flat upward surface 35 (FIG. 6) of a projection 27 while, at the same time, engaging the vertical hook 13 of the following link. Flat lateral surface 31 of this link rests against lateral surface 33 of projection 27 (FIG. 6) while horizontal hook 15 goes to engage the vertical hook 13 of the next link and so on.

In order to provide more ease for the disengagement of the links, it is proposed to have one of the hooks 13 or 15 of a shorter length than the other, preferably of a length that will just overtake the other link as witness, the distance "a" of FIG. 1. Disengagement of the links will then be obtained by an upward motion, as depicted, in FIG. 5, by arrow E.

Wheel 3 must, of course, be provided with coupling facilities to a driving shaft and those are shown in FIG. 6 as a shaft aperture 36 and a key way 37.

I claim:

1. A sprocket wheel comprising: a quadrilateral body having a predetermined thickness defining edge lateral surfaces; recesses cut-out of each corner of said body through said lateral surfaces and defining therebetween abutting lands; triangular projections integral with, and projecting away from said lands, all said projections pointing in the same direction around the lateral surfaces.

2. A sprocket wheel comprising: a substantially square body having a predetermined thickness defining edge lateral surfaces; recesses cut out of each corner of said body through said lateral surfaces and defining four abutting lands; a triangular projection integral with and projecting away from each of said lands; all of said projections pointing in the same direction around the lateral surfaces.

3. In combination, a chain composed of a plurality of interchangeable links arranged in succession, each link comprising: an elongated body having two ends of substantially equal circular cross-sections; one of said ends curving upwardly and backwardly over said body through an arc of approximately 180° to form a hook; the other of said ends curving laterally and backwardly over said body through an arc of approximately 180° to form another hook; the inner diameter of said arcs being at least as great as the diameter of the circular cross-sections; said end curving upwardly extending generally in a vertical plane; said body having a central portion provided with a flat top surface normal to said vertical plane and inclined in relation to a line joining the centers of the arcs; a sprocket wheel for said chain comprising: a quadrilateral body having a predetermined thickness defining edge lateral surfaces; recesses cut-out of each corner of said body through said lateral surfaces and defining therebetween abutting lands; triangular projections integral with, and projecting away from said lands; all said projections pointing in the same direction around the lateral surfaces whereby said chain engages said sprocket by having the flat top surface of one of its links abut one surface of a triangular projection and the lateral hook enter the adjacent recess of said body.

References Cited in the file of this patent

UNITED STATES PATENTS

| | | |
|---|---|---|
| 955,377 | Brisse | Apr. 19, 1910 |
| 2,243,274 | Ernst | May 27, 1941 |
| 2,602,343 | Barrett | July 8, 1952 |
| 2,799,388 | Wilson | July 16, 1957 |
| 2,800,031 | Schultz | July 23, 1957 |
| 2,833,152 | Hedlund | May 6, 1958 |
| 2,863,554 | Cordis | Dec. 9, 1958 |

FOREIGN PATENTS

| | | |
|---|---|---|
| 453,205 | Canada | Dec. 7, 1948 |
| 822,167 | Germany | Nov. 22, 1951 |